United States Patent
Okoshi

(10) Patent No.: US 8,540,380 B2
(45) Date of Patent: Sep. 24, 2013

(54) PROJECTOR WITH A RADIATION SOURCE

(75) Inventor: Masayuki Okoshi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 199 days.

(21) Appl. No.: 13/104,497

(22) Filed: May 10, 2011

(65) Prior Publication Data

US 2011/0279784 A1 Nov. 17, 2011

(30) Foreign Application Priority Data

May 17, 2010 (JP) .................... 2010-113141

(51) Int. Cl.
*G03B 21/14* (2006.01)

(52) U.S. Cl.
USPC ........... 353/119; 353/31; 353/52; 353/79; 353/85; 353/122; 349/5; 349/7; 362/257

(58) Field of Classification Search
USPC ............ 353/31, 52, 74, 79, 85, 119, 122; 349/5, 7–9, 58–61; 362/109, 217.14, 257, 362/259, 276, 286, 310, 362; 361/702–704, 361/709, 719, 816, 818
See application file for complete search history.

(56) References Cited

U.S. PATENT DOCUMENTS

| | | | |
|---|---|---|---|
| 6,179,426 B1* | 1/2001 | Rodriguez et al. | 353/69 |
| 6,793,343 B2* | 9/2004 | Nakano et al. | 353/61 |
| 6,880,938 B2 | 4/2005 | Nakano | |
| 7,423,866 B2 | 9/2008 | Miyamoto et al. | |
| 7,726,820 B2 | 6/2010 | Hara et al. | |
| 7,980,709 B2 | 7/2011 | Huang et al. | |
| 2007/0285273 A1 | 12/2007 | Kobayashi | |
| 2008/0055570 A1* | 3/2008 | Kong et al. | 353/100 |
| 2010/0214542 A1* | 8/2010 | Kito et al. | 353/122 |

FOREIGN PATENT DOCUMENTS

| | | |
|---|---|---|
| CN | 1869805 A | 11/2006 |
| JP | 2003-215700 A | 7/2003 |
| JP | 2006-293926 A | 10/2006 |
| JP | 2007-274609 A | 10/2007 |
| TW | 200937096 A | 9/2009 |

* cited by examiner

*Primary Examiner* — Gerorgia Y Epps
*Assistant Examiner* — Sultan Chowdhury
(74) *Attorney, Agent, or Firm* — ALG Intellectual Property, LLC

(57) ABSTRACT

A projector is provided with a radiation source adapted to radiate an electromagnetic wave during an operation and an exterior housing adapted to house the radiation source inside, wherein the exterior housing includes a first housing made of synthetic resin, and a second housing including a shield material adapted to block the electromagnetic wave, and disposed at a position for covering the radiation source in a plan view.

7 Claims, 8 Drawing Sheets

PROJECTOR WITH A RADIATION SOURCE

CROSS-REFERENCE

The entire disclosure of Japanese Patent Application No. 2010-113141 filed May 17, 2010 is expressly incorporated by reference herein.

BACKGROUND

1. Technical Field

The present invention relates to a projector.

2. Related Art

In the past, there has been known a projector provided with a shield structure for blocking the electromagnetic wave from a power supply unit to thereby prevent (provide measures against EMI) the electromagnetic wave from leaking to the outside of the exterior housing (see, e.g., JP-A-2003-215700 (Document 1)).

In the projector described in Document 1, there is adopted a shield structure in which the power supply unit is housed inside the cylindrical member on which a metal evaporation process is performed or metal foil is attached.

However, since the cylindrical member covering the periphery of the power supply unit is adopted in the shield structure described in Document 1, there arises a problem that the cylindrical member hinders downsizing and weight reduction of the projector.

SUMMARY

An advantage of some aspects of the invention is to provide a projector with which downsizing and weight reduction can be achieved.

According to an aspect of the invention, there is provided a projector including a radiation source adapted to radiate an electromagnetic wave during an operation, and an exterior housing adapted to house the radiation source inside, wherein the exterior housing includes a first housing made of synthetic resin, and a second housing including a shield material adapted to block the electromagnetic wave, and disposed at a position for covering the radiation source in a plan view.

In this aspect of the invention, a part of the electromagnetic wave radiated from the radiation source is blocked by the second housing as apart of the exterior housing.

According to this configuration, apart of the shield structure can be configured with the exterior housing, and therefore downsizing and weight reduction of the projector can be achieved compared to the configuration of the related art of providing the cylindrical member separately from the exterior housing.

Further, since only a part (the second housing) of the exterior housing is adopted as the shield structure, weight reduction of the projector can be achieved compared to the case of adopting the overall exterior housing as the shield structure, for example, the case of adopting the exterior housing wholly made of metal.

In the projector of the above aspect of the invention, it is preferable that a recess recessed toward the inside of the projector is formed in the first housing, and adapted to house the radiation source, and the second housing is disposed on the first housing so as to close the recess.

In this aspect of the invention, the radiation source is housed in the recess formed in the first housing.

According to this configuration, even in the case in which the radiation source is disposed adjacent to the heat generation source such as a light source device disposed inside (outside the recess) the exterior housing, since the recess partitions the heat generation source and the radiation source, the air heated by the heat generation source is prevented from flowing around the radiation source, and therefore, the temperature rise in the radiation source can be prevented.

Further, the recess can be provided as the reinforcing structure for the first housing, and in the case of composing at least a part of the exterior housing by combining the first housing and the second housing with each other, the strength of the exterior housing can sufficiently be maintained.

Therefore, low-profiling of the exterior housing becomes possible, and therefore, downsizing and weight reduction of the projector can be achieved.

In the projector of the above aspect of the invention, it is preferable that a shield plate including a shield material adapted to block the electromagnetic wave is further provided.

In this configuration, since the first housing is attached with the shield plate, the countermeasure against EMI can sufficiently be provided by the shield plate in addition to the shield structure provided by the second housing.

In the projector of the above aspect of the invention, it is preferable that the shield plate is attached to the first housing so as to cover the radiation source in a plan view with the recess intervening between the shield plate and the radiation source.

In this configuration, since the shield plate is disposed so as to cover the radiation source with the recess (the first housing made of synthetic resin) intervening therebetween, the shield plate and the radiation source can be prevented from having electrical contact with each other due to the recess. Therefore, since there is no need for making a separate insulating plate intervene between the shield plate and the radiation source, downsizing and weight reduction of the projector can be achieved due to the elimination of the member.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An embodiment of the invention will hereinafter be explained with reference to the accompanying drawings.

Configuration of Projector

Figure 1:
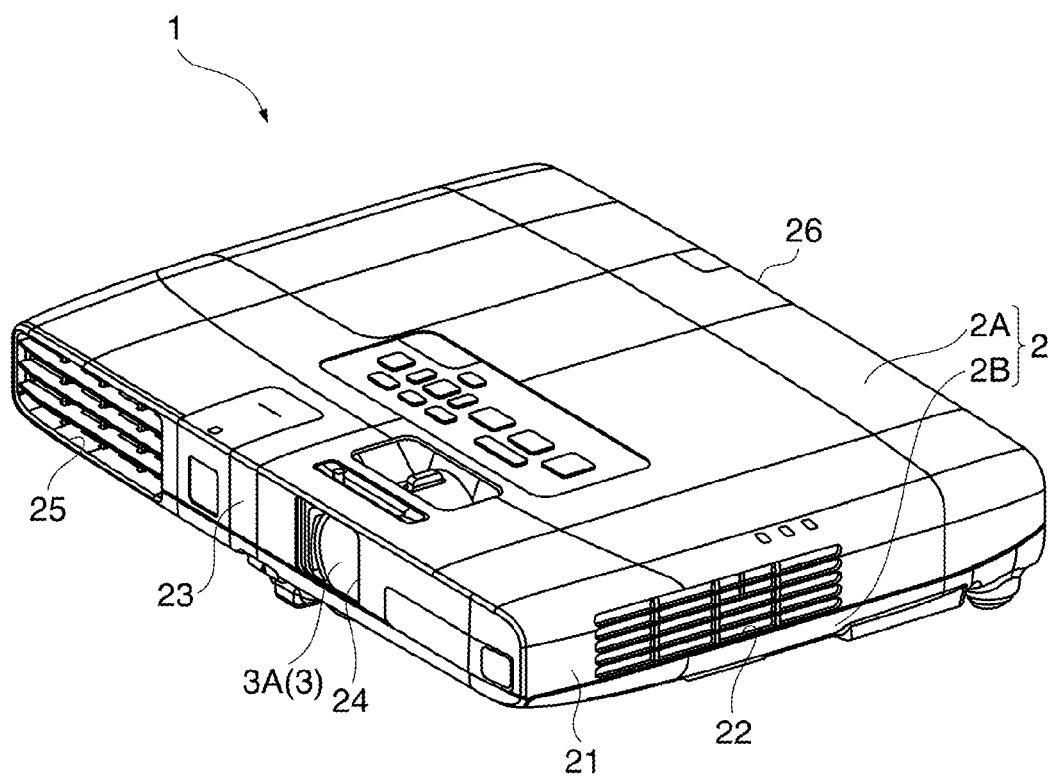
FIG. 1 is a perspective view showing an external appearance of a projector according to the present embodiment.
Figure 2:
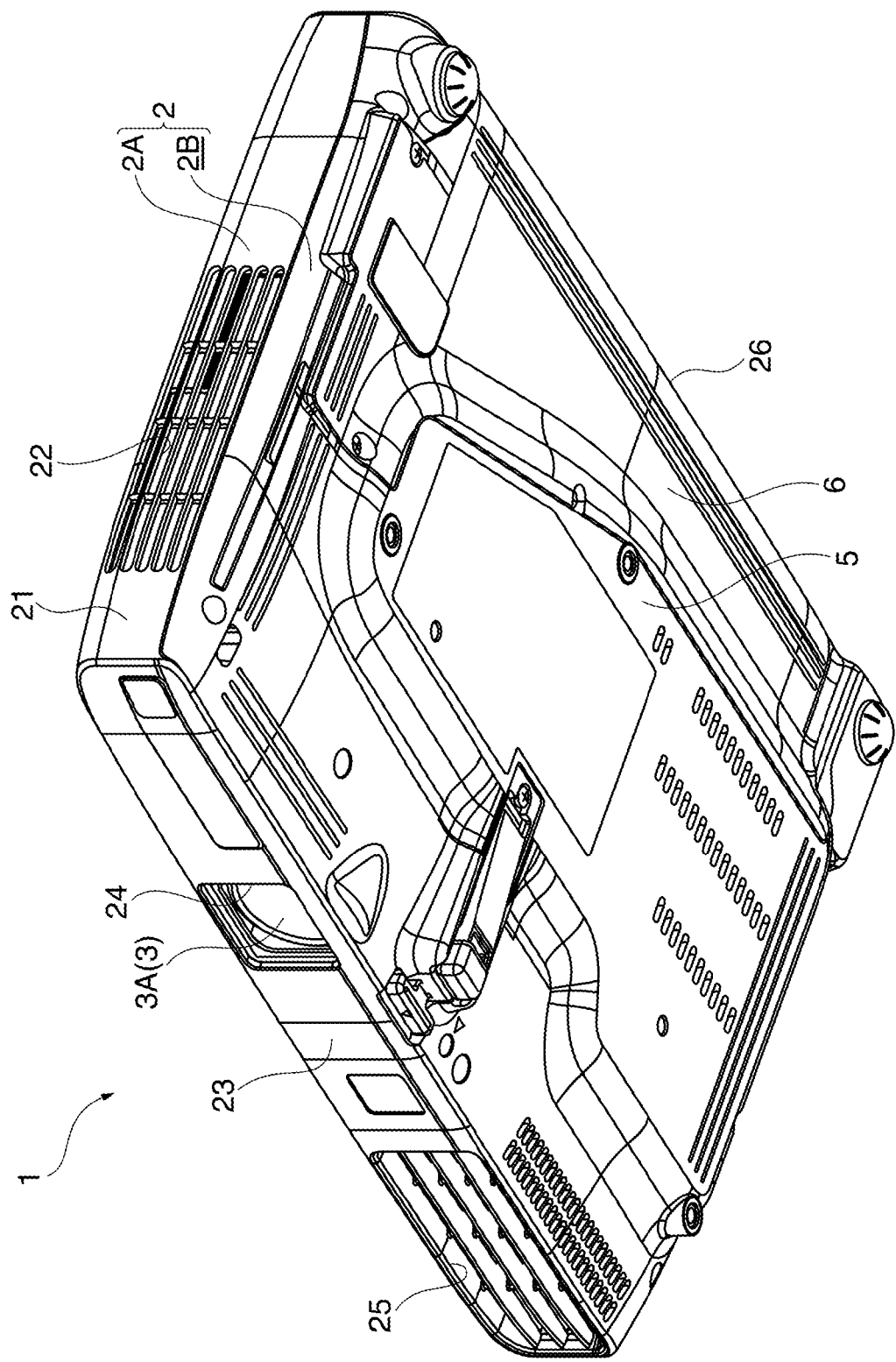
FIG. 2 is a perspective view showing an external appearance of a projector according to the present embodiment.
Figure 3:
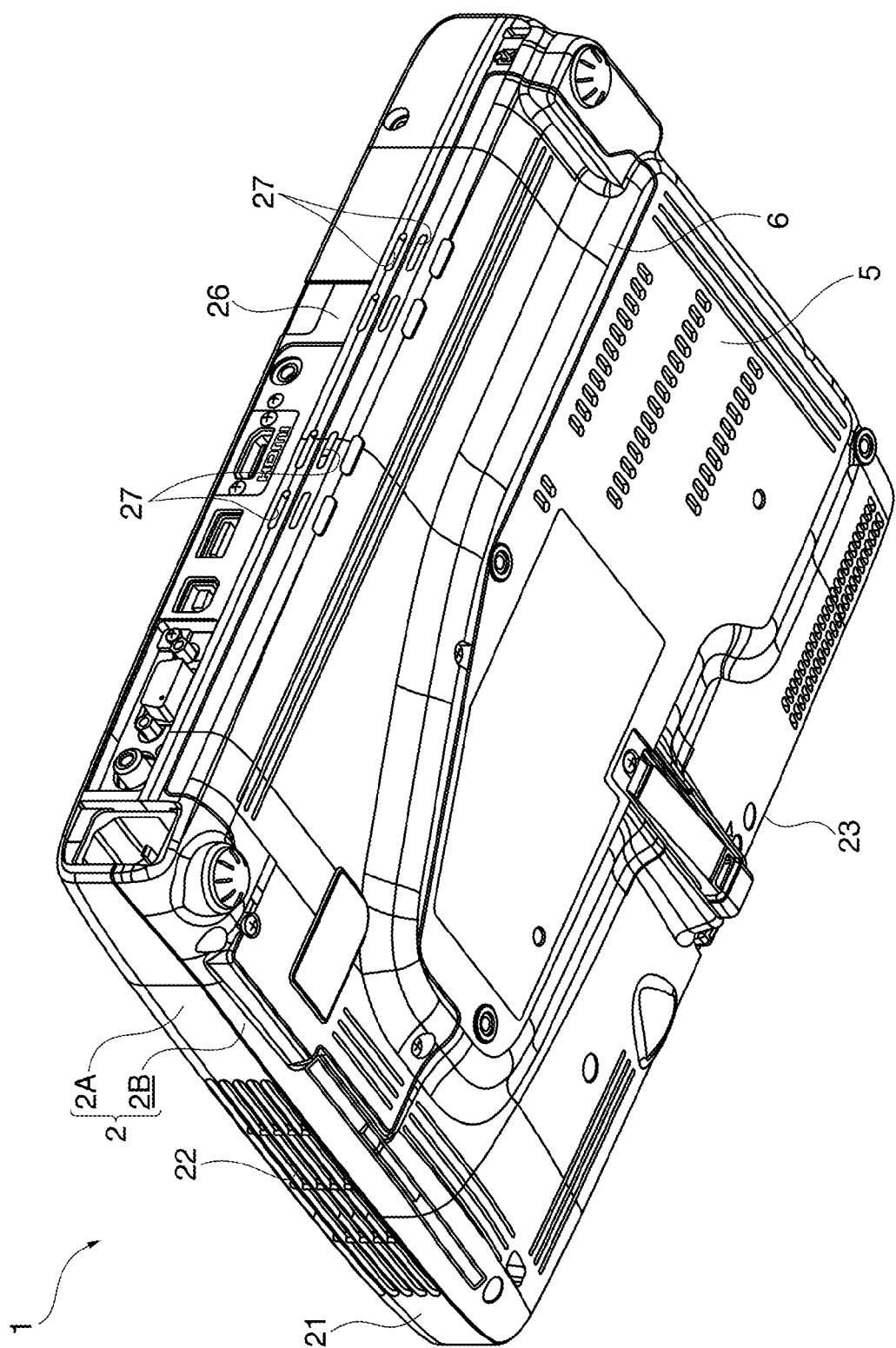
FIG. 3 is a perspective view showing an external appearance of a projector according to the present embodiment.

FIGS. 1 through 3 are perspective views showing the external appearance of a projector 1 in the present embodiment. Specifically, FIG. 1 is a perspective view of the projector 1 viewed from the upper front side thereof, FIG. 2 is a perspective view of the projector 1 viewed from the lower front side thereof, and FIG. 3 is a perspective view of the projector 1 viewed from the lower rear side thereof.

It should be noted that hereinafter the projection side (the side on which a projection lens 3A (FIGS. 1 and 2) is disposed) in the projector 1 is assumed to be the foreside, and the opposite side thereof is assumed to be the backside. Further, "upper" and "lower" described hereinafter correspond to the upside and downside in the state in which the projector 1 is installed in a posture shown in FIG. 1.

The projector 1 projects an image to thereby display a projection image on a screen (not shown). As shown in FIGS. 1 through 3, the projector 1 is provided with an exterior housing 2 constituting the exterior, an optical unit 3, a power supply unit 4 (see FIGS. 4 and 5) as a radiation source, and so on.

Configuration of Exterior Housing

As shown in FIGS. 1 through 3, the exterior housing 2 is composed of an upper case 2A and a lower case 2B combined with each other, and has a roughly rectangular solid shape.

The upper case 2A is formed of a molded component made of synthetic resin.

It should be noted that the details of the lower case 2B will be described later.

In the exterior housing 2, a right wall section 21 located on the right viewed from the foreside is provided with a first air inlet 22 for taking the external air into the inside thereof as shown in FIGS. 1 through 3.

It should be noted that although not shown specifically, the first air inlet 22 is attached with an air filter for eliminating dust or the like included in the external air.

Further, in the exterior housing 2 a front wall section 23 located on the foreside is provided with a pass-through opening 24 for letting the projected light beam (the image) pass as shown in FIG. 1 or 2.

Further, the front wall section 23 is provided with an air outlet 25 for ejecting the internal air to the outside disposed on the left side of the pass-through opening 24 viewed from the foreside as shown in FIG. 1 or 2.

Further, in the exterior housing 2, there is formed a second air inlet 27 for taking the external air into the inside thereof disposed on the lower portion of a rear wall section 26 located on the backside as shown in FIG. 3.

Configuration of Optical Unit

Although the specific illustration and explanation are omitted because the optical unit 3 is used in various general projectors, the optical unit 3 is provided with a light source device, a light modulation device such as a liquid crystal panel for modulating the light beam emitted from the light source device, a projection lens 3A (FIGS. 1 and 2) for projecting the light beam modulated by the light modulation device, and so on.

Configuration of Power Supply Unit

Figure 4:
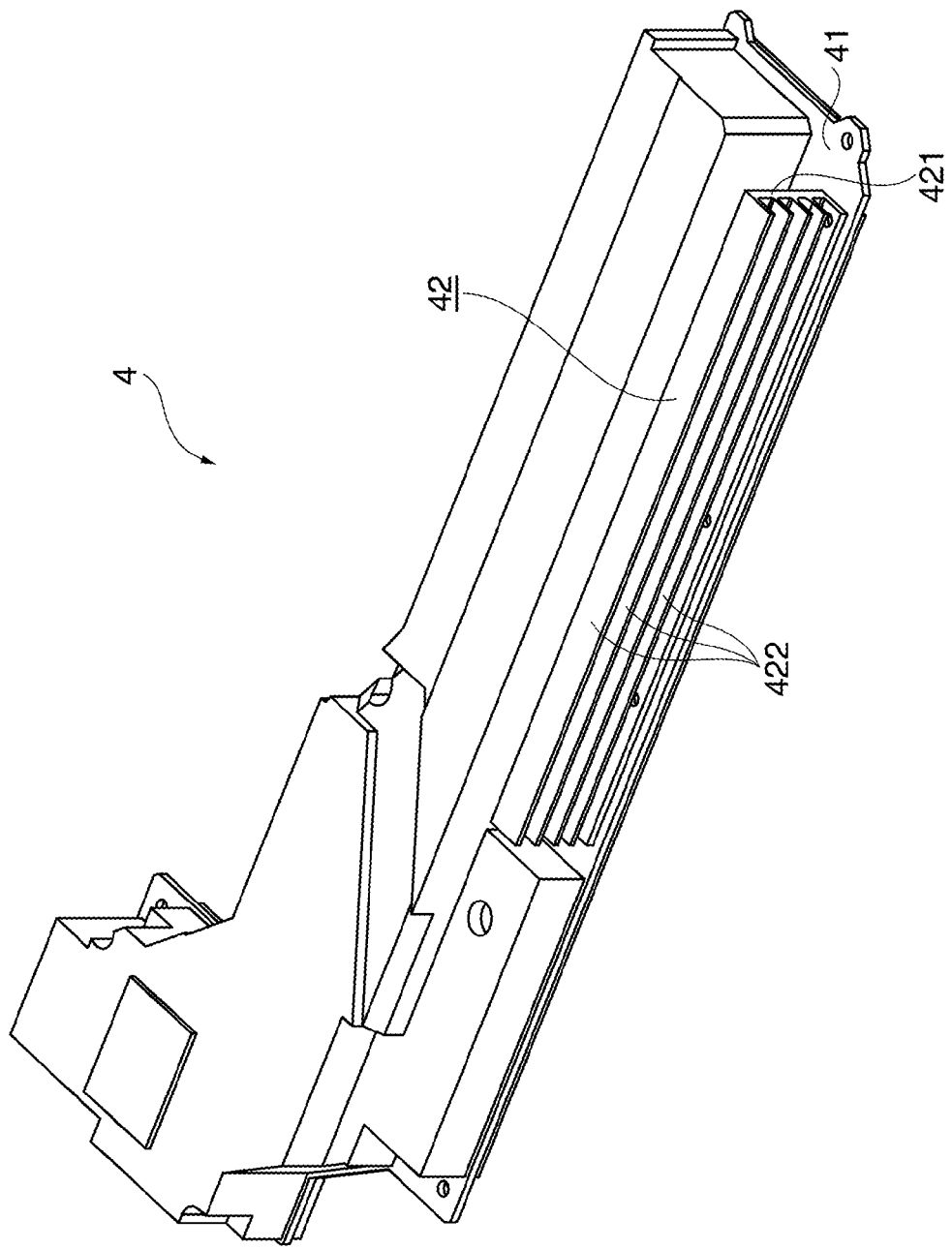
FIG. 4 is a perspective view showing a power supply unit in the present embodiment.

FIG. 4 is a perspective view showing the power supply unit 4. Specifically, FIG. 4 is a perspective view showing the power supply unit 4 viewed from the upper back side thereof.

The power supply unit 4 accepts the commercial alternating-current power from the outside via a power cable not shown to generate a direct-current voltage stabilized at a predetermined level, and supplies it to a light source device (not shown) of the optical unit 3, a control board (not shown) for controlling the overall projector 1, and so on.

As shown in FIG. 4, the power supply unit 4 has a roughly L shape in a plan view extending in a lateral direction along the rear wall section 26, and at the same time, having the left portion viewed from the backside extending toward the foreside. Further, the power supply unit 4 is provided with a printed-wiring board 41 with a plurality of circuit elements (not shown) mounted thereon, and a radiation section 42 attached to the printed-wiring board 41.

As shown in FIG. 4, the radiation section 42 is formed of a so-called heat sink provided with a plate member 421 and a plurality of protruding stripes 422, and is attached to the backside portion on the upper surface of the printed-wiring board 41 to radiate heat of the printed-wiring board 41.

The plate member 421 is erected on the upper surface of the printed-wiring board 41 so that the plate surfaces respectively face the foreside and backside.

The plurality of protruding stripes 422 is formed so as to protrude from the backside end face of the plate member 421 toward the backside and extend in a lateral direction along the rear wall section 26, and is arranged side by side in a vertical direction.

Configuration of Lower Case

Figure 5:
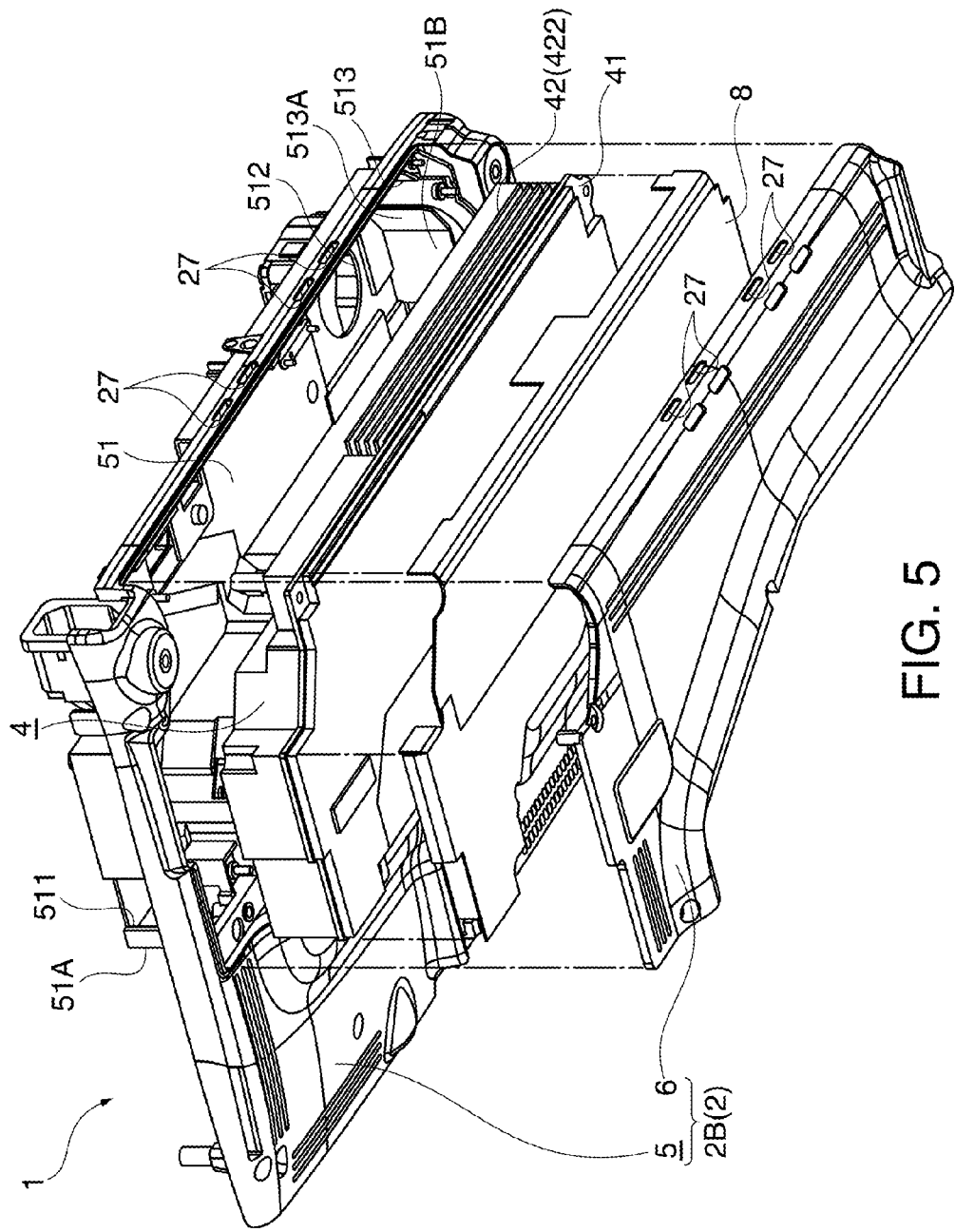
FIG. 5 is a diagram for explaining the structure of a lower case in the present embodiment.

FIG. 5 is a diagram for explaining the structure of the lower case 2B. Specifically, FIG. 5 is an exploded perspective view of the lower case 2B viewed from the lower back side thereof.

As shown in FIG. 5, the lower case 2B is provided with a first housing 5 and a second housing 6.

Configuration of First Housing

Figure 6:
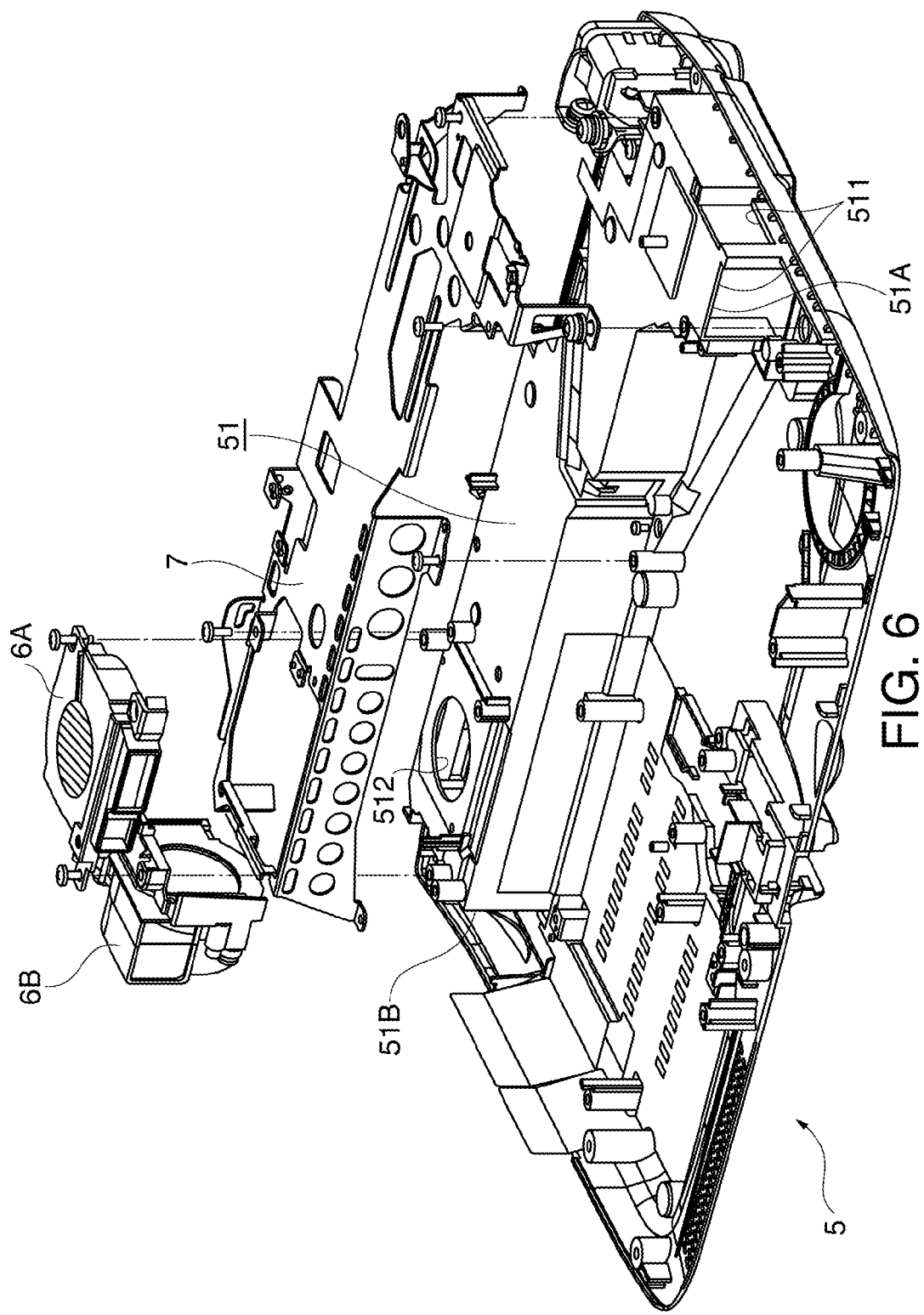
FIG. 6 is a perspective view showing a first housing in the present embodiment.
Figure 7:
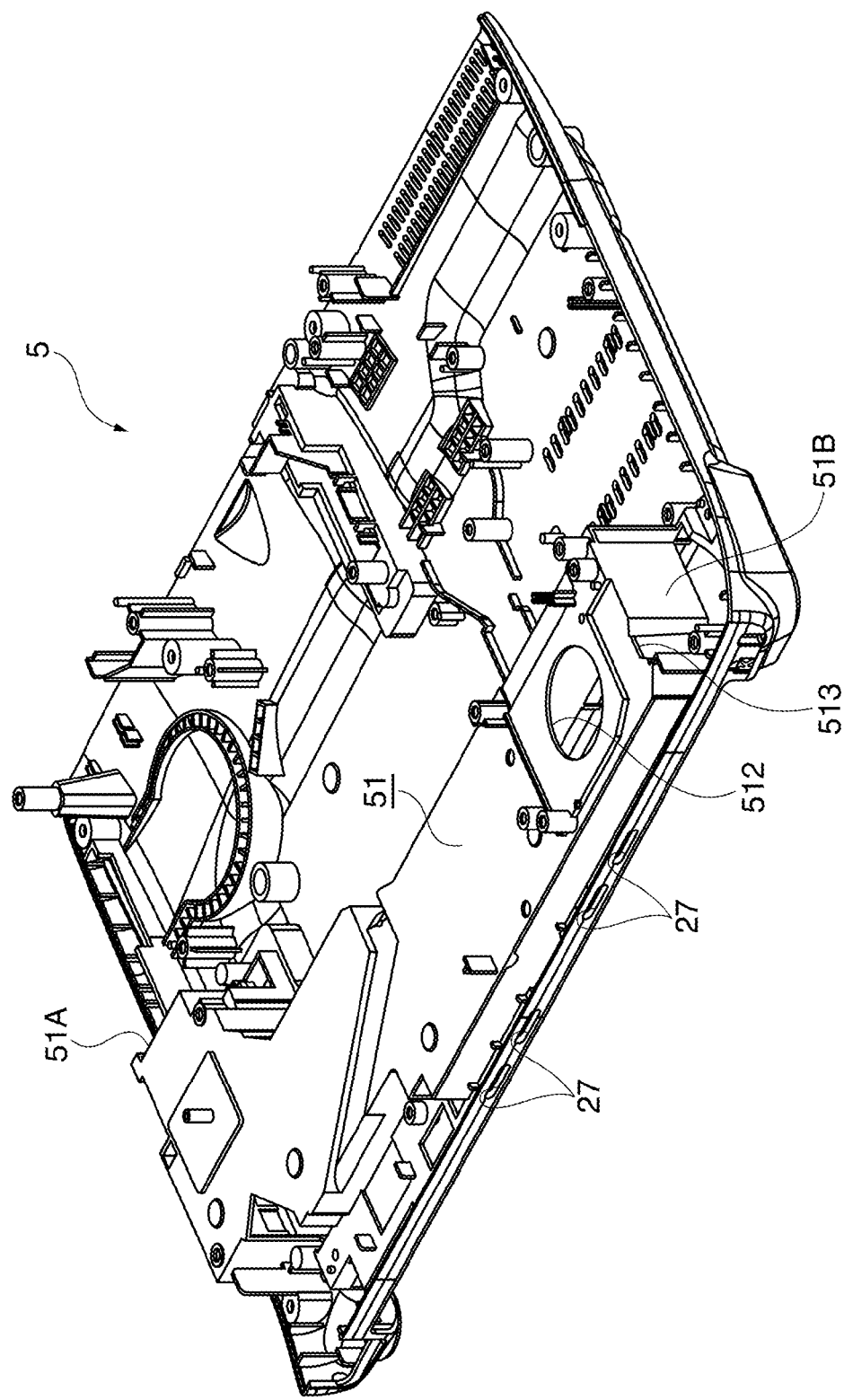
FIG. 7 is a perspective view showing the first housing in the present embodiment.

FIGS. 6 and 7 are perspective views showing the first housing 5. Specifically, FIG. 6 is an exploded perspective view of the first housing 5 viewed from the upper front side (the inner side of the exterior housing 2). FIG. 7 is a perspective view of the first housing 5 viewed from the upper back side thereof.

The first housing 5 has a rectangular shape in a plan view, and is formed of a molded component made of synthetic resin similarly to the upper case 2A.

On the back side of the first housing 5, there is formed a recess 51 (FIGS. 5 through 7) having a roughly L shape in a plan view so as to correspond to the planar shape of the power supply unit 4, and recessed toward the inside (the upper side) of the exterior housing 2.

As shown in FIG. 5, the recess 51 is a portion in which the power supply unit 4 is housed from the underside thereof.

In the recess 51, a first opening 511 for communicating the inside and the outside of the recess 51 with each other is formed in the sidewall section on the side of one end 51A of the roughly L shape in a plan view as shown in FIG. 5 or 6.

It should be noted that the one end 51A is disposed at a position close to the first air inlet 22. Therefore, it results that some of the air introduced inside the exterior housing 2 via the first air inlet 22 is taken into the inside of the recess 51 via the first opening 511.

Further, in the recess 51, a second opening 512 is formed in the bottom section on the side of the other end 51B of the roughly L shape in a plan view as shown in FIGS. 5 through 7. The second opening 512 ejects the air which is introduced inside the recess 51 via the first opening 511 to the outside (the inside of the exterior housing 2) of the recess 51.

Further, in the recess 51, the bottom section on the side of the other end 51B is attached with a first cooling fan 6A as shown in FIG. 6.

Therefore, it results that the some of the air inside the recess 51 is sucked by the first cooling fan 6A via the second opening 512.

Further, in the recess 51, a part of the second air inlet 27 described above is formed in the backside sidewall section as shown in FIG. 5 or 7.

Further, in the other end 51B of the recess 51, a third opening 513 is formed in the sidewall section on the right side viewed from the back side as shown in FIG. 5 or 7. The third opening 513 ejects the air which is introduced inside the recess 51 via the second air inlet 27 to the outside (the inside of the exterior housing 2) of the recess 51.

In the third opening 513, a current plate 513A (see FIG. 8) projecting toward the inside of the recess 51 is formed in the edge section in the foreside.

Further, in the recess 51, the sidewall section on the right side viewed from the back side in the other end 51B is attached with a second cooling fan 6B as shown in FIG. 6.

Therefore, it results that the some of the air inside the recess 51 is sucked by the second cooling fan 6B via the third opening 513.

It should be noted that although the specific illustration is omitted, the sidewall of the recess 51 is also provided with an opening for providing wiring with other members such as a light source device disposed inside (outside the recess 51) the exterior housing 2.

Further, the inside of the exterior housing 2 is attached with a shield plate 7 so as to cover the bottom section and the sidewall section of the recess 51 as shown in FIG. 6.

The shield plate 7 is configured including a shield material for blocking electromagnetic waves.

It should be noted that the shield plate 7 is made of magnesium in the present embodiment.

Configuration of Second Housing

As shown in FIG. 2, 3, or 5, the second housing 6 has a planar shape substantially the same as the planar shape of the recess 51, and is fixed to the first housing 5 with screws or the like to thereby close the recess 51. In other words, the second housing 6 is disposed at the position for covering the power supply unit 4 housed inside the recess 51 in a plan view.

Further, the second housing 6 is configured including a shield material for blocking electromagnetic waves.

It should be noted that the second housing 6 is made of magnesium similarly to the shield plate 7 in the present embodiment.

Here, it is sufficient for the shield plate 7 and the second housing 6 to be configured including the shield material, and the shield material is not limited to magnesium. For example, it is also possible to adopt the configuration of dispersing metallic powder, metallic fiber made of for example Cu, or the filler obtained by plating carbon fiber or glass fiber with metal in resin, performing a metal evaporation process on the surface of resin, attaching metallic foil to the surface of resin, or applying conductive paint including metallic powder or the like on the surface of resin. Further, it is also possible to adopt Ti, V, Cr, Zr, Nb, Mo, Hf, Ta, W, Fe, Ni, Co, Cu, Al, Zn, alloys of two or more of these metals, stain-less steel, permalloy, and so on.

Further, the part of the second air inlet 27 described above is formed in the backside of the second housing 6 as shown in FIG. 5.

Further, an insulating plate 8 having a planar shape substantially the same as the planar shape of the recess 51 and for avoiding electrical contact between the power supply unit 4 and the second housing 6 is disposed between the power supply unit 4 and the second housing 6 as shown in FIG. 5.

Cooling Structure of Power Supply Unit

Figure 8:
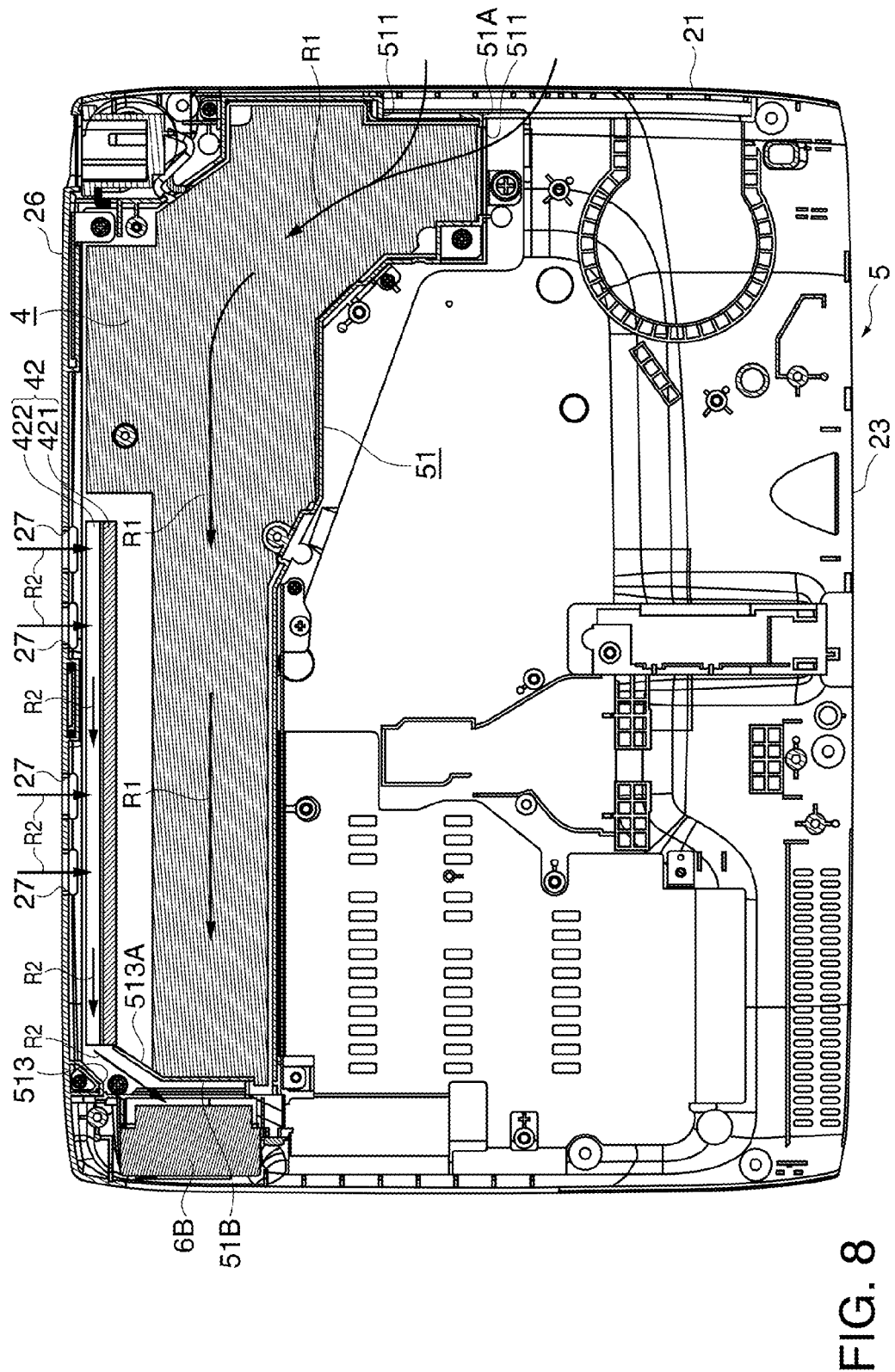
FIG. 8 is a diagram for explaining the cooling structure of the power supply unit in the present embodiment.

FIG. 8 is a diagram for explaining the cooling structure of the power supply unit 4. Specifically, FIG. 8 is a diagram showing the cross-sectional surface obtained by cutting the projector 1 in the condition in which the power supply unit 4 is housed inside the recess 51 with a horizontal plane.

In the condition in which the power supply unit 4 is housed inside the recess 51, the radiation section 42 is located in the foreside of the second air inlet 27 in such a manner as shown in FIG. 8.

Further, in the condition described above, although the specific illustration is omitted, the upper end portion of the radiation section 42 has contact with the bottom section of the recess 51.

Further, in the condition described above, the tip of the current plate 513A has contact with the left end portion of the plate member 421 viewed from the front side as shown in FIG. 8.

Further, it results that the power supply unit 4 is cooled by the air tracing a first channel R1 and the air tracing the second channel R2 as shown in FIG. 8.

More specifically, the air tracing the first channel R1 is the air introduced inside from the outside of the exterior housing 2 via the first air inlet 22 (an air filter), and is therefore free of dust. Further, the air flows from the first opening 511 toward the second opening 512 through the inside the recess 51 from the one end 51A toward the other end 51B, and cools the printed-wiring board 41 and the plurality of circuit elements (not shown). The air after cooling is sucked by the first cooling fan 6A via the second opening 512, and is ejected to the outside of the exterior housing 2 via the air outlet 25.

In contrast, the air tracing the second channel R2 is the air introduced inside from the outside of the exterior housing 2 via the second air inlet 27, and therefore the dust has not yet been eliminated therefrom. Then, the air is introduced into the inside of the recess 51, and then flows toward the other end 51B along the radiation section 42 and the current plate 513A to thereby cool the radiation section 42. The air after cooling is sucked by the second cooling fan 6B via the third opening 513, and is ejected to the outside of the exterior housing 2 via the air outlet 25.

In other words, as the cooling structure of the power supply unit 4, there is adopted the structure capable of preventing the air (the air from which the dust has not yet been eliminated) tracing the second channel R2 from being mixed with the air (free of dust) tracing the first channel R1. By adopting such a structure, the dust included in the air tracing the second channel R2 can be prevented from adhering to the printed-wiring board 41, and at the same time the power supply unit 4 can effectively be cooled using the air tracing the respective channels R1, R2.

According to the present embodiment described above, the following advantages are obtained.

In the present embodiment, a part of the electromagnetic wave radiated from the power supply unit 4 is blocked by the second housing 6 as a part of the lower case 2B.

According to this configuration, apart of the shield structure can be configured with the lower case 2B, and therefore downsizing and weight reduction of the projector 1 can be achieved compared to the configuration of the related art of providing the cylindrical member separately from the exterior housing 2.

In particular, since the second housing 6 is provided to the lower case 2B, it is not required to dispose the shield member separately between the lower side of the power supply unit 4 and the exterior housing as required in the related art, and the shield member can be eliminated. Therefore, low-profiling of the projector 1 can be achieved.

Further, since only a part (the second housing 6) of the exterior housing 2 is adopted as the shield structure, weight reduction of the projector 1 can be achieved compared to the case of adopting the overall exterior housing 2 as the shield structure, for example, the case of adopting the exterior housing 2 wholly made of metal.

Further, the power supply unit 4 is housed in the recess 51 provided to the first housing 5.

According to this configuration, even in the case in which the power supply unit 4 is disposed adjacent to the heat generation source such as a light source device disposed inside (outside the recess 51) the exterior housing 2, since the recess 51 partitions the heat generation source and the power supply unit 4, the air heated by the heat generation source is prevented from flowing around the power supply unit 4, and therefore, the temperature rise in the power supply unit 4 can be prevented.

Further, since the second housing 6 is made of metal (magnesium) with a high heat radiation property, it is possible to radiate heat of the power supply unit 4 to the outside of the exterior housing 2 via the second housing 6, and therefore, the temperature rise in the power supply unit 4 can preferably be prevented.

Further, the recess 51 can be provided as the structure which reinforce the first housing 5, and in the case of composing the lower case 2B by combining the first housing 5 and the second housing 6 with each other, the strength of the lower case 2B can sufficiently be maintained. Therefore, low-profiling of the lower case 2B becomes possible, and therefore, downsizing and weight reduction of the projector 1 can be achieved.

Further, since the first housing 5 is attached with the shield plate 7, the countermeasure against EMI can sufficiently be provided by the shield plate 7 in addition to the shield structure provided by the second housing 6.

Further, since the shield plate 7 is disposed so as to cover the power supply unit 4 with the recess 51 (the first housing 5 made of synthetic resin) intervening therebetween, the shield plate 7 and the power supply unit 4 can be prevented from having electrical contact with each other due to the recess 51. Therefore, since there is no need for making a separate insulating plate intervene between the shield plate 7 and the power supply unit 4, downsizing and weight reduction of the projector 1 can be achieved due to the elimination of the member.

In particular, since the shield plate 7 is disposed above the power supply unit 4 with the recess 51 intervening therebetween, the insulating plate can be eliminated compared to the structure, for example, of disposing the shield plate 7, the insulating plate, and the power supply unit 4 in this order from the upper side in the inside of the recess 51. Therefore, low-profiling of the projector 1 can be achieved.

It should be noted that the invention is not limited to the embodiment described above but includes modifications and improvements within a range where the advantages of the invention can be achieved.

Although in the present embodiment the power supply unit 4 is adopted as the radiation source, the radiation source is not limited thereto, and the control board or the like for controlling the overall operation of the projector 1, for example, can also be adopted providing the member radiates an electromagnetic wave during the operation.

Although in the embodiment the lower case 2B is composed of the first housing 5 and the second housing 6, the invention is not limited thereto, but it is also possible to constitute the upper case 2A with the first housing and the second housing.

Although in the present embodiment there is adopted the configuration of providing the recess 51 to the first housing 5, and housing the power supply unit 4 in the recess 51, the invention is not limited thereto, but can adopt a configuration of eliminating the recess 51 of the first housing 5.

The invention can be applied to a projector used for presentations and a home theater.

What is claimed is:

1. A projector comprising:
    a radiation source adapted to radiate an electromagnetic wave during an operation; and
    an exterior housing adapted to house the radiation source inside,
    the exterior housing includes
        a first housing made of synthetic resin, the first housing having a recess that is recessed from an exterior facing surface of the first housing toward an inside of the projector, and
        a second housing including a shield material adapted to block the electromagnetic wave, and disposed at a position for covering the radiation source in a plan view, the second housing being disposed over the recess of the first housing such that the recess is blocked from being open to an exterior of the projector by the second housing.

2. The projector according to claim 1, wherein
    the recess is formed in the first housing, and is adapted to house the radiation source, and
    the second housing is disposed on the first housing so as to close the recess.

3. The projector according to claim 2, further comprising:
    a shield plate including a shield material adapted to block the electromagnetic wave.

4. The projector according to claim 3, wherein
    the shield plate is attached to the first housing so as to cover the radiation source in a plan view with the recess intervening between the shield plate and the radiation source.

5. The projector according to claim 2, wherein
    the radiation source includes a printed-wiring board and a plurality of circuit elements, and
    the recess includes a first opening and a second opening adapted to let air inside the exterior housing flow toward the printed-wiring board and the plurality of circuit elements.

6. The projector according to claim 5, wherein
    the radiation source includes a radiation section, and
    the recess includes a third opening adapted to eject the air introduced from the outside of the exterior housing and flowing by the radiation section.

7. The projector according to claim 1, wherein the radiation source is a power supply unit.

* * * * *